E. FERRISS.
FLOATING REAPER.
APPLICATION FILED APR. 7, 1909.
981,183.
Patented Jan. 10, 1911
2 SHEETS—SHEET 1.
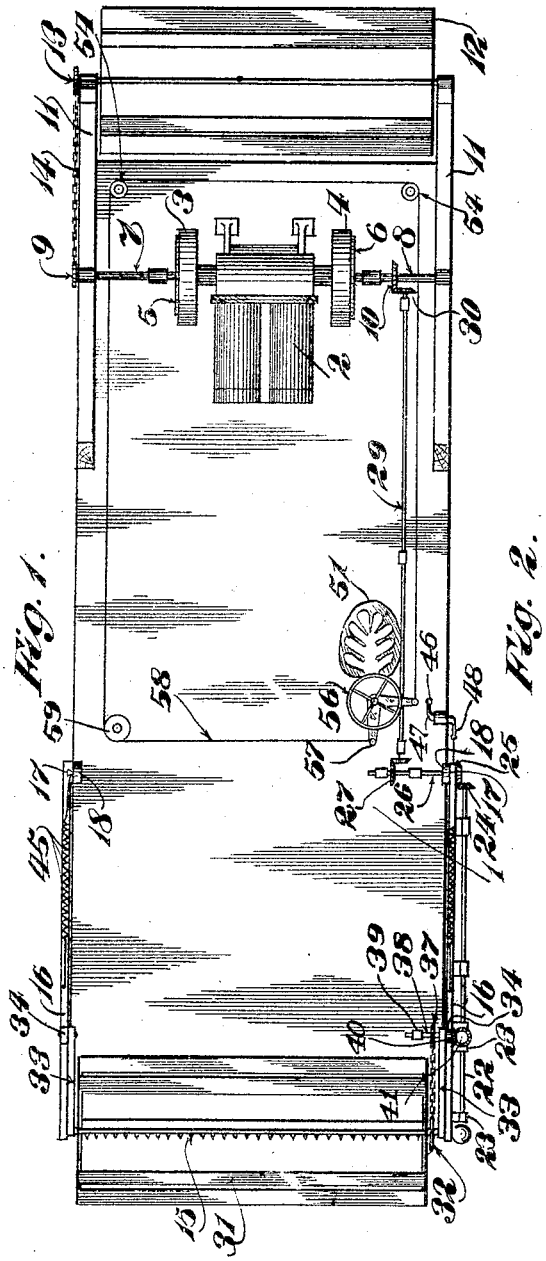
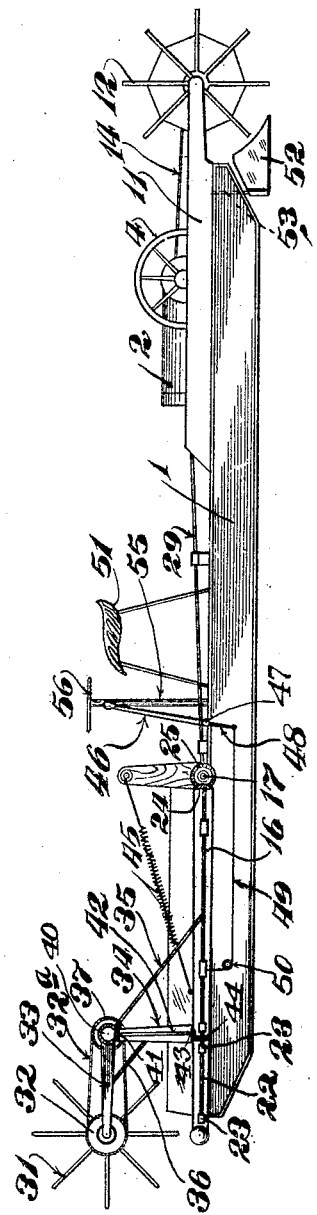
Witnesses:
R. P. Hicks
Alice J. Swanson
Inventor:
Edward Ferriss
By his Attorneys
Williamson & Merchant

E. FERRISS.
FLOATING REAPER.
APPLICATION FILED APR. 7, 1909.

981,183.

Patented Jan. 10, 1911.

2 SHEETS—SHEET 2.

UNITED STATES PATENT OFFICE.

EDWARD FERRISS, OF NAPOLEON, NORTH DAKOTA.

FLOATING REAPER.

981,183.

Specification of Letters Patent. Patented Jan. 10, 1911.

Application filed April 7, 1909. Serial No. 488,513.

*To all whom it may concern:*

Be it known that I, EDWARD FERRISS, citizen of the United States, residing at Napoleon, in the county of Logan and State of North Dakota, have invented certain new and useful Improvements in Floating Reapers; and I do hereby declare the following to be a full, clear, and exact description of the invention, such as will enable others skilled in the art to which it appertains to make and use the same.

My invention has for its especial object to provide a floating reaper adapted for use in cutting and collecting wild rice and other grains or grasses that grow in the water, and to this end, it consists of the novel devices and combinations of devices hereinafter described and defined in the claims.

In the accompanying drawings, which illustrate the invention, like characters indicate like parts throughout the several views.

Figure 3:
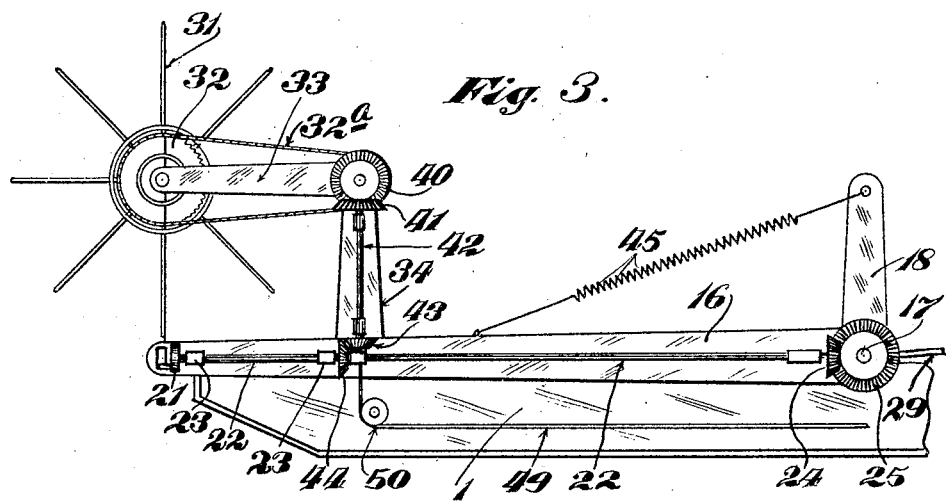
Figure 4:
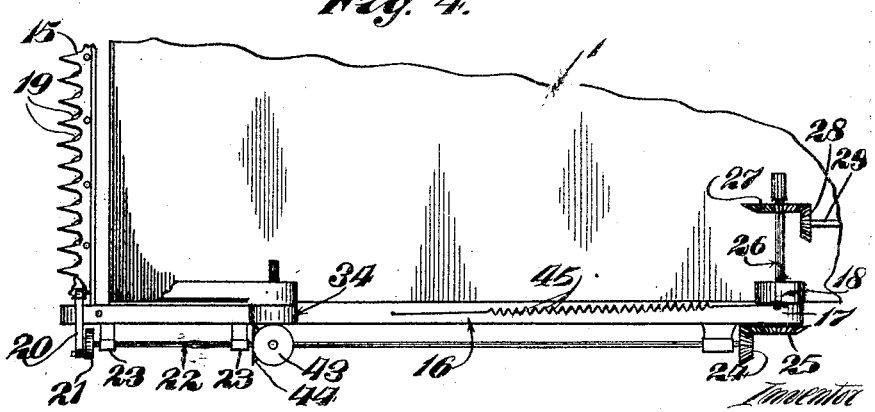

Referring to the drawings, Figure 1 is a plan view of the so-called floating reaper; Fig. 2 is a side elevation of the same; Fig. 3 is a side elevation of the front portion of the reaper, showing the parts thereof on a larger scale than in Figs. 1 and 2; and Fig. 4 is a plan view of the parts shown in Fig. 3, some portions being broken away.

In accordance with my invention, suitable cutting mechanism and a coöperating reel are mounted on the forward end of a suitable float, which is preferably in the form of a barge or flat bottomed boat 1, adapted to float in very shallow water. On the rear portion of this boat, an engine 2, preferably of the explosive type, is suitably mounted. The crank shaft of this engine, which is preferably extended transversely of the boat, is provided at one end with a fly wheel 3' and at its other end with a similar fly wheel 4. The fly wheels 3 and 4 are preferably made to serve the purpose of clutch members and are arranged for coöperation, respectively, with frictional clutch members 5 and 6 secured to the inner ends of short shafts 7 and 8 mounted in suitable bearings on the boat. The said clutch devices may be of the usual or any other suitable construction and may be operated in the customary or in any suitable way.

At its outer end, the shaft 7 is shown as provided with a sprocket wheel 9, and the shaft 8, at its intermediate portion, is shown as provided with a bevel gear 10. Mounted in suitable rearwardly extended beams 11 of the boat 1 is a paddle wheel propeller 12, the shaft of which is provided at one end with a sprocket 13, over which and the sprocket 9 a sprocket chain 14 is arranged to run and thereby drive the paddle wheel from the engine.

A suitable sickle guiding finger bar 15 is located just in front of the front end of the boat 1 and, at its ends, is rigidly secured to a pair of supporting arms 16, the rear ends of which are pivotally connected at 17 to upwardly extended laterally spaced bearings 18 rigidly secured to the sides of the boat. A sickle bar 19 is guided by and coöperates with the finger bar 15. The finger bar 15 and sickle bar 19 are preferably of the type generally used in reapers and harvesters, and the said sickle bar at one end is connected by a short pitman 20 to the crank pin of a crank disk or head 21 carried by a short rearwardly extended counter shaft 22 mounted in suitable bearings 23 rigidly secured, as shown, to the lefthand supporting arm 16. At its rear end, the shaft 22 is provided with a bevel gear 24 that meshes with a bevel gear 25 secured to the outer end of a short transverse counter shaft 26. This counter shaft 26 extends through the lefthand bearing 18 and through the hub of the lefthand supporting arm 16 and its axis is concentric with the common axes of the pivotal connections between said arms and bearings.

At its inner end, the shaft 26 is provided with a bevel gear 27 that meshes with a bevel gear 28 secured to the front end of a rearwardly extended counter shaft 29 mounted in suitable bearings on the boat 1. This counter shaft 29 is provided at its rear end with a bevel gear 30 that meshes with the bevel gear 10 of the engine driven shaft 8 already described.

A suitable reel 31 is located just above the finger bar 15 and sickle bar 19, and its shaft, which is provided at one end with a sprocket 32, is journaled in the forwardly extended arms 33 of reel supported pedestals 34 rigidly secured, at their lower ends, one to each of the vertically movable supporting arms 16. As shown, the upper end portions of the pedestals are further tied to the arms 16 by oblique braces 35 and the arms 33 are further tied to the pedestals 34 by oblique braces 36, as best shown in Fig. 2. The reel, it will thus be seen, is supported and carried by the supporting arms 16 and is adjustable with the finger bar and sickle bar, so that it maintains its proper working relation thereto under vertical adjustments of the cutting mechanism.

The sprocket chain 32ª runs over the reel sprocket 32 and over the sprocket 37 secured to a short counter shaft 38 journaled in the upper portions of the lefthand pedestal 34, which latter is shown as provided with an offset supplemental bearing 39 of the said shaft, as shown in Fig. 1. At its outer end, the shaft 38 is provided with a bevel gear 40 that meshes with a bevel gear 41 secured to the upper end of an upright counter shaft 42 mounted in suitable bearings on the lefthand pedestal 34. At its lower end, the shaft 42 is provided with a bevel gear 43 that meshes with a bevel gear 44 secured at the intermediate portion of the long counter shaft 22, which latter, as before described, is mounted in suitable bearings on the lefthand pivotally mounted supporting arm 16.

The pivotally mounted supporting arms 16 and the parts carried thereby, to-wit, the finger bar, sickle bar, reel and driving shafts and gears to the said reel and sickle bar. are yieldingly supported or drawn upward preferably by a pair of heavy coiled springs 45, the rear ends of which are secured to the upwardly extended portions of the bearings 18 and to the intermediate portions of the said arms 16. These springs should be strong enough to hold the said levers 16 and parts carried thereby in uplifted positions, and the said arms are yieldingly drawn downward and held in any desired set positions by suitable mechanism which, as shown, comprises as follows: A lever 46 is secured to a transverse shaft 47 mounted in suitable bearings on the sides of the boat and provided at its ends outside of the boat with depending arms 48. These arms 48 are connected by cables or flexible connections 49 to the intermediate portions of the supporting arms 16 and are passed over suitable guide sheaves 50 mounted in the sides of the boat. If desired, a latch arch or other suitable means may be provided for securing the lever 46 in different position.

As is evident, by manipulation of the lever 46, the cutting mechanism and the reel may be adjusted to any desired altitude in respect to the boat and, hence, in respect to the surface of the water. In practice, this floating reaper would preferably be used as a header and, hence, the cutting mechanism and reel should always be so adjusted as to cut off only the heads or upper end portions of the grain. The heads of the cut grain will by the reel be thrown backward from the cutting mechanism into the boat.

In this specification and in the claims, the term "boat" is used in a broad sense to include any suitable kind of a floating support for the harvesting mechanism.

The numeral 51 indicates a seat carried by the boat. A suitable device in also shown for steering the boat and this, as illustrated, comprises a pair of rudder blades 52 secured to the lower ends of short upright shafts 53 mounted in suitable bearings in the rear end of the boat and provided at their upper ends, above the bottom of the boat, with sheaves or pulleys 54. Just in front of the seat is an upright steering shaft 55 mounted at its lower end in a suitable bearing in the boat and provided at its upper end with a hand wheel 56. Near its lower end, the steering shaft 55 is provided with a bell crank 57, to the arms of which the ends of a steering cable 58 are secured. This steering cable 58 runs over or around the two rudder sheaves 54 and around an idle guide sheave 59 suitably mounted on the boat.

As is evident, the power of the engine may be utilized to simultaneously propel the boat forward and to operate the reel and cutting mechanism, or the boat may be propelled while the reel and cutting mechanism are idle, or again, the reel and cutting mechanism may be operated while the paddle wheel or propeller remains idle.

What I claim is:

1. The combination with a boat, of a vertically movable support, means yieldingly drawing said support upward, a connection for drawing said support downward, and cutting mechanism carried by said adjustable support.

2. The combination with a boat, of a pair of laterally spaced supporting arms pivotally connected to said boat, one or more springs yieldingly drawing said arms upward, a connection for drawing said arms downward, and a cutting mechanism carried at the free ends of said arms, substantially as described.

In testimony whereof I affix my signature in presence of two witnesses.

EDWARD FERRISS.

Witnesses:
ALICE J. SWANSON,
HARRY D. KILGORE.